United States Patent
Yamaguchi et al.

(10) Patent No.: US 6,435,731 B1
(45) Date of Patent: Aug. 20, 2002

(54) FERRULE HAVING OPTICAL FIBER INCORPORATED THEREIN AS AN INTEGRAL PART THEREOF AND METHOD FOR PRODUCTION THEREOF

(75) Inventors: Tadashi Yamaguchi, Sendai; Tetsuya Katsumi, Miyagi-ken; Mamoru Ishida, Sendai, all of (JP)

(73) Assignees: YKK Corporation; NTT Advanced Technology Corporation, both of Tokyo (JP)

( * ) Notice: Subject to any disclaimer, the term of this patent is extended or adjusted under 35 U.S.C. 154(b) by 29 days.

(21) Appl. No.: 09/675,672

(22) Filed: Sep. 29, 2000

(30) Foreign Application Priority Data

Oct. 1, 1999  (JP) .......................................... 11-280974

(51) Int. Cl.⁷ ................................................ G02B 6/36
(52) U.S. Cl. ............................................ 385/78; 385/60
(58) Field of Search ............................... 385/78, 60, 80

(56) References Cited

U.S. PATENT DOCUMENTS

| | | | | |
|---|---|---|---|---|
| 4,722,584 A | * | 2/1988 | Kakii et al. | 385/78 |
| 4,729,624 A | * | 3/1988 | Kakii et al. | 385/78 |
| 5,577,144 A | * | 11/1996 | Rossana et al. | 385/78 |
| 5,778,125 A | * | 7/1998 | Busse et al. | 385/80 |
| 5,862,280 A | * | 1/1999 | Tanaka et al. | 385/78 |
| 6,158,900 A | * | 12/2000 | Omiya et al. | 385/78 |

FOREIGN PATENT DOCUMENTS

| | | |
|---|---|---|
| JP | A 05333238 | 12/1993 |
| JP | A 8015568 | 1/1996 |
| JP | A 8194131 | 7/1996 |
| JP | A 9141704 | 3/1997 |
| JP | A 10-186176 | 7/1998 |

* cited by examiner

Primary Examiner—Hemang Sanghavi
Assistant Examiner—Scott Knauss
(74) Attorney, Agent, or Firm—Finnegan, Henderson, Farabow, Garrett, & Dunner, L.L.P.

(57) ABSTRACT

An optical connector ferrule has an optical fiber incorporated therein as an integral part thereof, wherein the optical fiber is integrally fixed in the ferrule directly or through the medium of the metal tube embedded in the ferrule. This ferrule of the optical fiber built-in type can be produced by inserting an optical fiber or a metal tube having an optical fiber fitted therein into a mold provided with a molding cavity which defines the outer shape of an optical connector ferrule, injecting a fluid material kept at an elevated temperature into the cavity of the mold, and solidifying the cast material by cooling. The optical fiber or both the optical fiber and the metal tube are strongly fixed in the ferrule integrally by the thermal shrinkage or coagulation shrinkage of the ferrule during the production thereof.

25 Claims, 7 Drawing Sheets

FERRULE HAVING OPTICAL FIBER INCORPORATED THEREIN AS AN INTEGRAL PART THEREOF AND METHOD FOR PRODUCTION THEREOF

BACKGROUND OF THE INVENTION

1. Field of the Invention

This invention relates to ferrules having an optical fiber incorporated therein as an integral part thereof (hereinafter referred to occasionally as "ferrule of the optical fiber built-in type") for connecting and/or fixing optical fiber ends or optical fiber cable ends to be used in optical communications. This invention also relates to methods for the production thereof.

2. Description of the Prior Art

Parts for optical connectors are required to have high dimensional accuracy in order to prevent the loss of light. More specifically, for the sake of coincidence between the axes of the optical fibers and the prevention of the loss of light, the parts for fixing and aligning the optical fibers require the machining with high accuracy in the order of submicrons.

The conventional method for the production of an optical connector ferrule (hereinafter referred to occasionally as "capillary") comprises the steps of first molding a suitable material such as a ceramic powder containing a binder, a synthetic resin, and a metal by injection molding, extrusion molding or the like thereby forming a ferrule blank (Japanese Patent Publication No. 8-30775B, Japanese Patent Applications, KOKAI (Early Publication) No. (hereinafter referred to briefly as "JP-A-") 8-15568, JP-A-8-194131, JP-A-9-141704, JP-A-10-186176, etc.), degreasing and sintering the resultant blank depending on the material used, and finishing the blank into a desired dimension by subjecting it to machining such as abrasive finishing of the outside diameter, abrasive finishing of the inside diameter, and polishing of the leading end into the spherical convex surface (PC polishing). Since the inside diameter of a small hole of the ferrule for the insertion of an optical fiber is very small (for instance, the diameter of the small hole of the capillary of the SC type is 0.126 mm), the wire lapping finishing is commonly used for the finishing of the inside diameter thereof. Accordingly, the process of production is lengthy and requires expensive apparatuses such as an inside diameter finishing machine and an outside diameter finishing machine, and the cost of production is inevitably large.

When the optical connector ferrule (capillary) is produced by the conventional injection molding, the formation of the small hole for the insertion of an optical fiber will inevitably require the use of a core pin having a minute diameter of about 0.1 mm. This process, therefore, has the problem of exposing the core pin to the possibility of sustaining breakage or bending during the casting or during the operation of drawing of the core pin after casting. Further, since the core pin is expensive, the breakage or the bending of the core pin forms a large factor for boosting the cost of the ferrule.

Moreover, the small hole for the insertion of an optical fiber formed as described above must be subjected to the inside diameter finishing in order to smoothen the inside surface of the hole and to acquire high circularity or roundness in cross section and sufficient dimensional accuracy thereof. The process of production, therefore, incurs an enormous cost inevitably.

When an optical fiber is inserted and fixed into the small hole of the ferrule formed as described above, it is necessary to apply an adhesive to the leading end of the optical fiber and then insert it into the small hole. Since the adhesive used in this operation is hygroscopic and thus deteriorates with time, it will be difficult to stably use the ferrule having the optical fiber fixed therein for a long time. Further, since the coefficient of linear thermal expansion of the optical fiber greatly differs from that of the adhesive (for instance, the coefficient of linear thermal expansion of quartz fiber is $0.5 \times 10^{-6}$/K, those of the ferrule materials are, for example, $10 \times 10^{-6}$/K in a metallic glass and $9 \times 10^{-6}$/K in zirconia, while that of the adhesive is $30–40 \times 10^{-6}$/K), the product will bring about such problem as separation of the optical fiber from the ferrule due to the heat cycle in the use.

Figure 1:
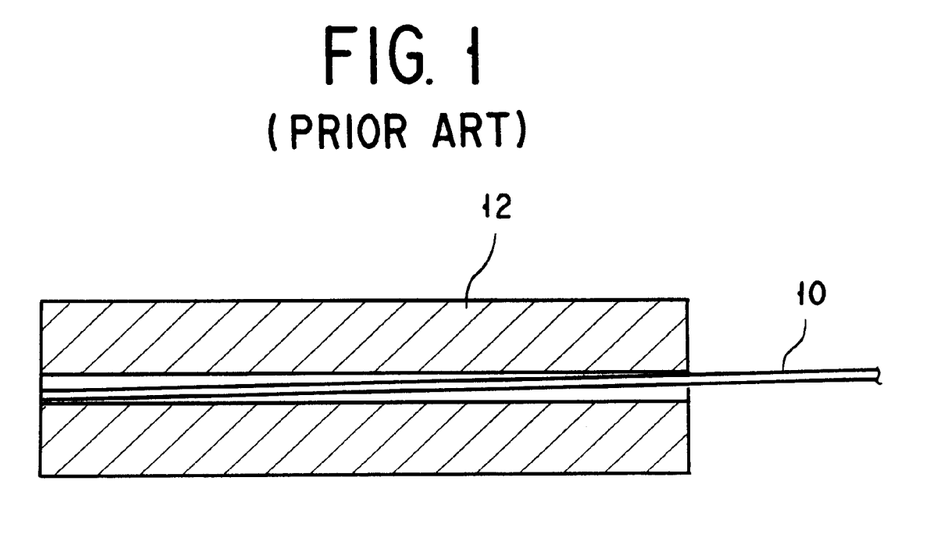
FIG. 1 is a fragmentary cross-sectional view schematically illustrating axial deviation of the center of an optical fiber from the center of a conventional ferrule into which the optical fiber is inserted, in the deformed form.

The small hole of the ferrule for the insertion of an optical fiber is so designed as to have an inside diameter slightly greater than the outside diameter of the optical fiber to secure the insertion of the optical fiber into the small hole of the optical connector ferrule. This dimensional design, however, incurs the problem that, when the optical fiber is inserted and fixed into the small insertion hole, the center of the optical fiber 10 deviates from the center of the ferrule 12 as shown in FIG. 1 in the deformed form. Such axial deviation greatly affects the connector insertion loss of the optical fibers.

SUMMARY OF THE INVENTION

It is, therefore, an object of the present invention to provide an inexpensive ferrule having an optical fiber strongly incorporated therein as an integral part thereof with high positional accuracy, which will not incur the problems caused by the use of a core pin or an adhesive as mentioned above and the problem that an optical fiber separates from the ferrule due to the deterioration of an adhesive caused by the heat cycle in the use.

A further object of the present invention is to provide a method which allows a ferrule of the optical fiber built-in type satisfying a predetermined shape, dimensional accuracy, and surface quality to be mass-produced with high efficiency by a simple process without requiring the use of a core pin and, therefore, enables to omit such machining steps as inside diameter finishing of the ferrule and adhesion of an optical fiber to the ferrule, thereby lowering the cost of production of the ferrule.

To accomplish the object mentioned above, the first aspect of the present invention provides a ferrule having an optical fiber incorporated therein as an integral part thereof.

The first embodiment of the ferrule according to the present invention is characterized by having an optical fiber integrally fixed therein during the production of an optical connector ferrule.

The second embodiment of the ferrule is characterized by comprising an optical connector ferrule, a metal tube embedded therein in the longitudinal direction thereof, and an optical fiber fitted into the metal tube, wherein the optical fiber is integrally fixed in the ferrule through the medium of the metal tube during the production of the ferrule.

In either embodiment mentioned above, preferably the optical fiber or both the optical fiber and the metal tube are strongly fixed in the ferrule by the thermal shrinkage or coagulation shrinkage of the optical connector ferrule during the production thereof.

The optical fiber may be in the form of extending only in the interior of the optical connector ferrule from one end to the other end thereof or further continuously extending outward from one end of the optical connector ferrule.

In one concrete embodiment, the metal tube has an inside diameter ranging from 0.1 mm to 1.0 mm and an outside diameter ranging from 0.14 mm to 2.3 mm and the ferrule has an outside diameter ranging from 0.2 mm to 2.5 mm.

The ferrule mentioned above may be manufactured from a metal, an amorphous alloy containing an amorphous phase in a volumetric ratio of at least 50%, ceramics or a synthetic resin.

In a preferred embodiment, the ferrule having an optical fiber incorporated therein as an integral part thereof is characterized by being formed of a substantially amorphous alloy having a composition represented by either one of the following general formulas (1) to (6) and containing an amorphous phase in a volumetric ratio of at least 50%:

$$M^1_a M^2_b Ln_c M^3_d M^4_e M^5_f \quad (1)$$

wherein $M^1$ represents either or both of the two elements, Zr and Hf; $M^2$ represents at least one element selected from the group consisting of Ni, Cu, Fe, Co, Mn, Nb, Ti, V, Cr, Zn, Al, and Ga; Ln represents at least one element selected from the group consisting of Y, La, Ce, Nd, Sm, Gd, Tb, Dy, Ho, Yb, and Mm (mish metal: aggregate of rare earth elements); $M^3$ represents at least one element selected from the group consisting of Be, B, C, N, and O; $M^4$ represents at least one element selected from the group consisting of Ta, W, and Mo; $M^5$ represents at least one element selected from the group consisting of Au, Pt, Pd, and Ag; and a, b, c, d, e, and f represent such atomic percentages as respectively satisfy $25 \leq a \leq 85$, $15 \leq b \leq 75$, $0 \leq c \leq 30$, $0 \leq d \leq 30$, $0 \leq e \leq 15$, and $0 \leq f \leq 15$.

$$Al_{100-g-h-i} Ln_g M^6_h M^3_i \quad (2)$$

wherein Ln represents at least one element selected from the group consisting of Y, La, Ce, Nd, Sm, Gd, Tb, Dy, Ho, Yb, and Mm; $M^6$ represents at least one element selected from the group consisting of Ti, V, Cr, Mn, Fe, Co, Ni, Cu, Zr, Nb, Mo, Hf, Ta, and W; $M^3$ represents at least one element selected from the group consisting of Be, B, C, N, and O; and g, h, and i represent such atomic percentages as respectively satisfy $30 \leq g \leq 90$, $0 \leq h \leq 55$, and $0 \leq i \leq 10$.

$$Mg_{100-p} M^7_p \quad (3)$$

wherein $M^7$ represents at least one element selected from the group consisting of Cu, Ni, Sn, and Zn; and p represents an atomic percentage falling in the range of $5 \leq p \leq 60$.

$$Mg_{100-q-r} M^7_q M^8_r \quad (4)$$

wherein $M^7$ represents at least one element selected from the group consisting of Cu, Ni, Sn, and Zn; $M^8$ represents at least one element selected from the group consisting of Al, Si, and Ca; and q and r represent such atomic percentages as respectively satisfy $1 \leq q \leq 35$ and $1 \leq r \leq 25$.

$$Mg_{100-q-s} M^7_q M^9_s \quad (5)$$

wherein $M^7$ represents at least one element selected from the group consisting of Cu, Ni, Sn, and Zn; $M^9$ represents at least one element selected from the group consisting of Y, La, Ce, Nd, Sm, and Mm; and q and s represent such atomic percentages as respectively satisfy $1 \leq q \leq 35$ and $3 \leq s \leq 25$.

$$Mg_{100-q-r-s} M^7_q M^8_r M^9_s \quad (6)$$

wherein $M^7$ represents at least one element selected from the group consisting of Cu, Ni, Sn, and Zn; $M^8$ represents at least one element selected from the group consisting of Al, Si, and Ca; $M^9$ represents at least one element selected from the group consisting of Y, La, Ce, Nd, Sm, and Mm; and q, r, and s represent such atomic percentages as respectively satisfy $1 \leq q \leq 35$, $1 \leq r \leq 25$, and $3 \leq s \leq 25$.

The second aspect of the present invention provides methods for the production of the ferrules having an optical fiber incorporated therein as an integral part thereof as mentioned above.

One mode of the methods is characterized by comprising the steps of inserting an optical fiber into a mold provided with a molding cavity which defines the outer shape of an optical connector ferrule so as to be disposed in the cavity, injecting a fluid material kept at an elevated temperature into the cavity of the mold, and solidifying the injected material by cooling, thereby strongly fixing the optical fiber in the ferrule produced.

Another mode of the methods is characterized by comprising the steps of inserting a metal tube having an optical fiber fitted therein into a mold provided with a molding cavity which defines the outer shape of an optical connector ferrule so as to be disposed in the cavity, injecting a fluid material kept at an elevated temperature into the cavity of the mold, and solidifying the injected material by cooling, thereby strongly fixing the optical fiber in the produced ferrule through the medium of the metal tube embedded in the ferrule.

In a preferred embodiment of this method, the optical fiber is set in the mold so as to have at least one end thereof continuously extended outward from the mold and the ferrule is produced while applying a tension load to the optical fiber during the production.

As a material for the ferrule mentioned above, a metal, an amorphous alloy containing an amorphous phase in a volumetric ratio of at least 50%, a ceramic paste, a synthetic resin or the like may be used.

In another preferred embodiment, the material mentioned above is a melt of an alloying material capable of producing a substantially amorphous alloy having a composition represented by either one of the aforementioned general formulas (1) to (6) and containing an amorphous phase in a volumetric ratio of at least 50%, and this molten alloy is forcibly transferred into the cavity of the mold mentioned above and rapidly solidified in the mold to confer amorphousness on the alloy.

BRIEF DESCRIPTION OF THE DRAWINGS

Other objects, features, and advantages of the invention will become apparent from the following description taken together with the drawings, in which:

FIGS. 2A to 2C are fragmentary cross-sectional views schematically illustrating an embodiment of the steps of production of the ferrule of the optical fiber built-in type according to the present invention; FIG. 2A depicting the state before an alloy is molten, FIG. 2B the state after the melt has been injected into a mold, and FIG. 2C the state after the product has been cut;

FIGS. 5A to 5C are fragmentary cross-sectional views schematically illustrating another embodiment of the steps of production of the ferrule of the optical fiber built-in type according to the present invention; FIG. 5A depicting the state before an alloy is molten, FIG. 5B the state after the melt has been injected into a mold, and FIG. 5C the state after the product has been cut;

DETAILED DESCRIPTION OF THE PREFERRED EMBODIMENTS

The method of the present invention, as described above, is characterized by comprising the steps of inserting an optical fiber or a metal tube having an optical fiber fitted therein into a mold provided with a molding cavity which defines the outer shape of an optical connector ferrule, injecting a fluid material kept at an elevated temperature into the cavity of the mold, and solidifying the injected material by cooling, thereby giving rise to the ferrule of the optical fiber built-in type having an optical fiber strongly fixed in the produced ferrule directly or through the medium of the metal tube embedded in the ferrule.

In such a method, the optical fiber or both the optical fiber and the metal tube are strongly fixed in the ferrule integrally by the thermal shrinkage or coagulation shrinkage of the optical connector ferrule during the production thereof. Since this method obviates the use of an expensive core pin during the injection molding and also the use of an adhesive in the operation of insertion of an optical fiber into the ferrule as conventionally employed in the art, the ferrule having an optical fiber incorporated therein as an integral part thereof with high positional accuracy can be produced without incurring the problems caused by the use of a core pin or an adhesive as mentioned above and the problem that an optical fiber separates from the ferrule due to the deterioration of an adhesive caused by the heat cycle in the use. Further, this ferrule of the optical fiber built-in type exhibits high durability and low connector insertion loss.

Further, since this method obviates such machining steps as inside diameter finishing of the ferrule and the step of adhesion of an optical fiber to the ferrule, the number of operation steps can be considerably lowered. Accordingly, the method of the present invention allows the ferrule of the optical fiber built-in type satisfying a predetermined shape, dimensional accuracy, and surface quality to be mass-produced with high efficiency by a simple process and, therefore, enables to lower the cost of production of the ferrule. Besides, by inserting an optical fiber through a metal tube and setting the optical fiber and the metal tube of this state in a metal mold, the breakage of the optical fiber is effectively prevented during the production of the ferrule of the optical fiber built-in type.

As a material for the ferrule of the optical fiber built-in type of the present invention, a metal, an amorphous alloy containing an amorphous phase in a volumetric ratio of at least 50%, paste of ceramics such as zirconia and alumina, a synthetic resin such as a fiber-reinforced polyester of the thermotropic liquid crystal type or the like may be used.

Now, the ferrule of the optical fiber built-in type according to the present invention and the method for the production thereof will be described below with reference to the accompanying drawings, by way of example, in the case of using an alloy as a ferrule material.

Figure 2A:
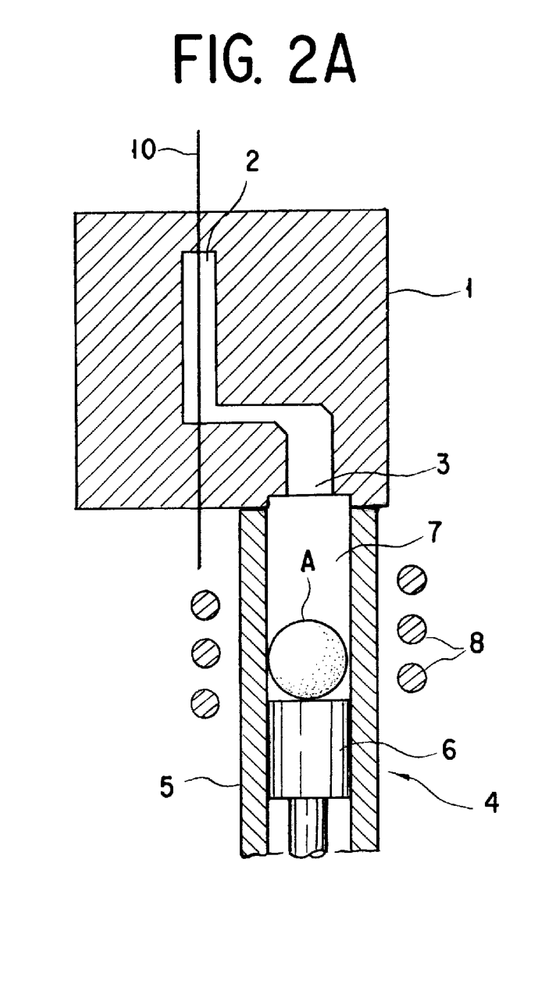
Figure 2B:
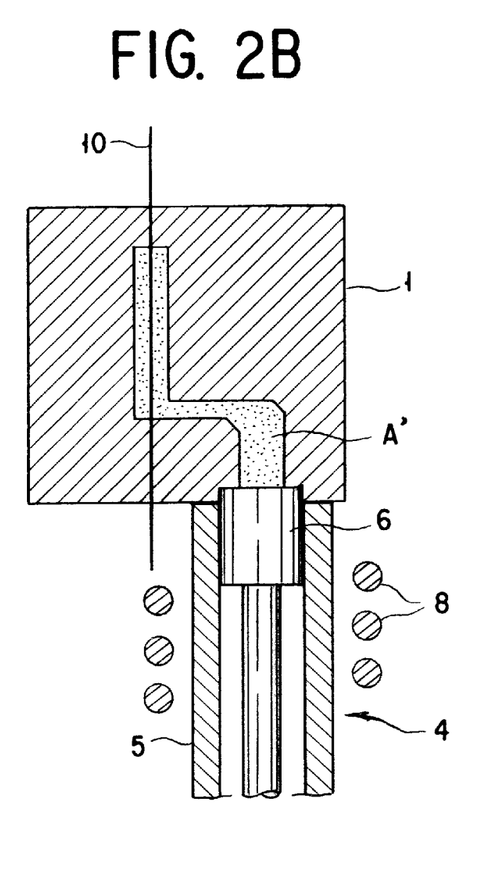
Figure 2C:
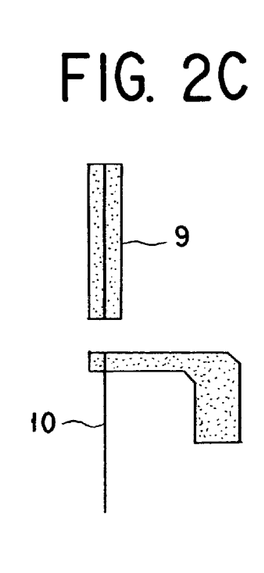

FIGS. 2A through 2C illustrate the schematic construction of one mode of embodying an apparatus and method for the production of the ferrule of the optical fiber built-in type of the present invention. In the figures, reference numeral 1 denotes a metal mold provided with a molding cavity 2 adapted to define the outside dimension of an optical connector ferrule. The mold 1 is a split mold which is separable, for example, at a hatched surface in the drawings. A sprue (through-hole) 3 communicating with the cavity 2 is formed in a lower portion of the mold 1.

While the mold 1 can be made of such metallic material as copper, copper alloy, cemented carbide or superalloy, it is preferred to be made of such material as copper or copper alloy which has a large thermal capacity and high thermal conductivity for the purpose of heightening the cooling rate of the molten alloy injected into the cavity 2. The mold 1 may have disposed therein such a flow channel as allow flow of a cooling medium like cooling water or cooling gas.

A melting vessel 4 is provided with a cylindrical sleeve 5 and a molten metal transferring member or piston 6 slidably disposed in the sleeve 5. The melting vessel 4 is disposed directly below the sprue 3 of the mold 1 in such a manner as to be reciprocated vertically. The piston 6 is vertically moved by means of a hydraulic cylinder (or pneumatic cylinder) not shown in the diagram. The upper part of the cylindrical sleeve 5 forms a raw material accommodating part 7 in combination with the upper face of the piston 6. A high frequency induction coil 8 as a heat source is disposed so as to encircle the raw material accommodating part 7. As the heat source, any arbitrary means such as one resorting to the phenomenon of resistance heating may be adopted besides the high-frequency induction heating. The material of the cylindrical sleeve 5 and that of the piston 6 are preferred to be such heat-resistant material as ceramics or metallic materials coated with a heat-resistant film.

Incidentally, for the purpose of preventing the molten alloy from forming an oxide film, it is preferred to dispose the apparatus in its entirety in a vacuum or an atmosphere of an inert gas such as Ar gas or establish a stream of an inert gas at least between the mold 1 and the raw material accommodating part 7 of the melting vessel 4.

The production of the ferrule of the optical fiber built-in type according to the present invention is effected by first setting the melting vessel 4 in a state separated downwardly from the mold 1 and then charging the empty space inside the raw material accommodating part 7 with the alloying raw material "A". The alloying raw material "A" to be used may be in any of the popular forms such as rods, pellets, and minute particles.

An optical fiber 10 is then placed in position in the cavity 2 of the mold 1 so as to vertically extend therein. An extension load is applied to this optical fiber 10 to pull the optical fiber in the longitudinal direction thereof. The optical fiber 10 may be arranged in any mode depending on the product aimed at. For instance, a relatively short optical fiber may be set in the mold 1 in such a manner that the opposite ends thereof extend from the upper and lower ends of the mold 1 respectively. Otherwise, a long optical fiber may be set in the mold 1 in such a manner that one end thereof extends from the lower end of the mold 1 and the remaining long portion continuously extends from the upper end of the mold 1. In another mode, a sheathed optical fiber (an optical fiber covered with a sheath) having one end portion from which a sheath is stripped to expose the optical fiber may be set in the mold 1 so that the exposed optical fiber portion is positioned in the cavity 2.

Subsequently, as shown in FIG. 2A, the melting vessel 4 is elevated until the upper end thereof abuts against the periphery of the sprue 3 of the mold 1 and the high frequency induction coil 8 is excited to heat the alloying raw material "A" rapidly, or vice versa. After the fusion of the alloying raw material "A" has been confirmed by detecting the temperature of the molten alloy, the high frequency induction coil 8 is demagnetized. Then, as shown in FIG. 2B, the hydraulic cylinder is actuated to effect rapid elevation of the piston 6 and injection of the molten alloy "A'" through the sprue 3 of the mold 1. The injected molten alloy "A'" is introduced into the cavity 2 and compressed and rapidly solidified therein. In this case, the cooling rate exceeding $10^3$ K/s can be obtained by suitably setting such factors as injection temperature and injection speed, for example. Thereafter, the melting vessel 4 is lowered and the mold 1 is separated to allow extraction of the cast product. The product portion 9 is severed from the cast product as shown in FIG. 2C.

The shapes of the cast products manufactured by the method described above are illustrated in FIG. 3 and FIG. 4.

Figure 3:
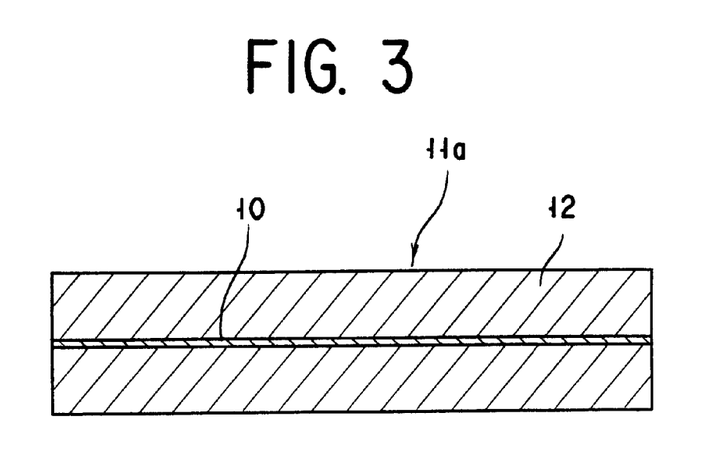
FIG. 3 is a cross-sectional view schematically illustrating one embodiment of the ferrule of the optical fiber built-in type according to the present invention.
Figure 4:
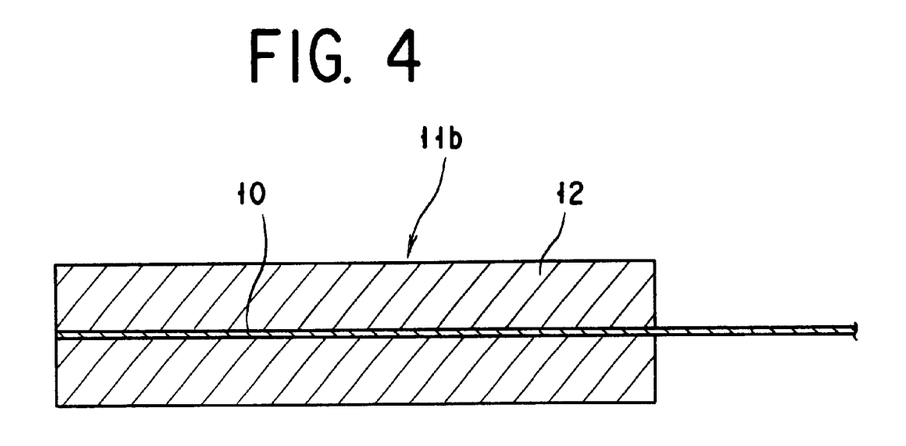
FIG. 4 is a fragmentary cross-sectional view schematically illustrating another embodiment of the ferrule of the optical fiber built-in type according to the present invention.

The ferrule (capillary) 11a of the optical fiber built-in type illustrated in FIG. 3 comprises a metallic ferrule (capillary) 12 and an optical fiber 10 integrally incorporated in the ferrule 12 and having opposite ends cut in flush with the end faces of the ferrule. On the other hand, in the ferrule 11b of the optical fiber built-in type illustrated in FIG. 4, one end of the optical fiber 10 integrally incorporated in the metallic ferrule 12 is cut in flush with the end face of the ferrule 12, while the remaining portion thereof continuously extends from the other end of the ferrule 12. In either product, since the cast product slightly shrinks in the radial direction due to the thermal shrinkage or coagulation shrinkage, the optical fiber 10 is strongly fixed in the metallic ferrule 12 integrally without causing any gap therebetween.

Figure 5A:
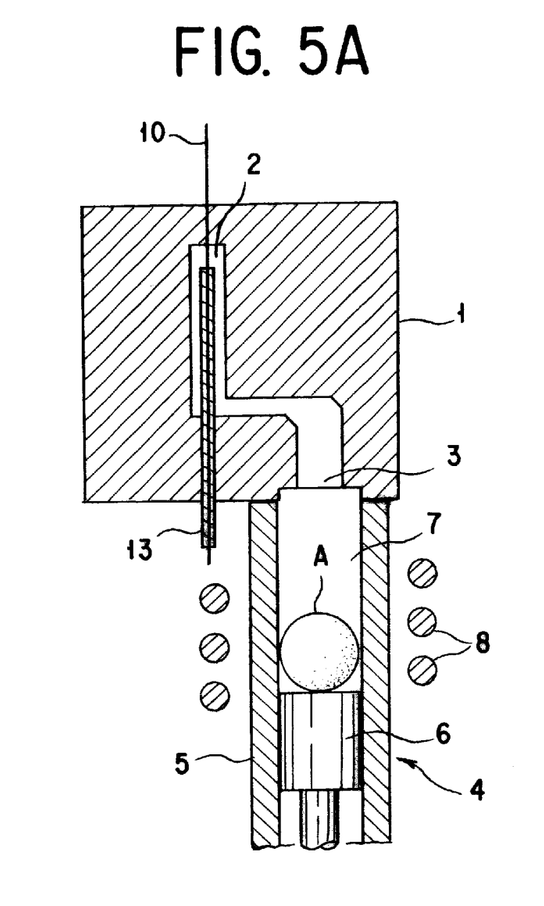
Figure 5B:
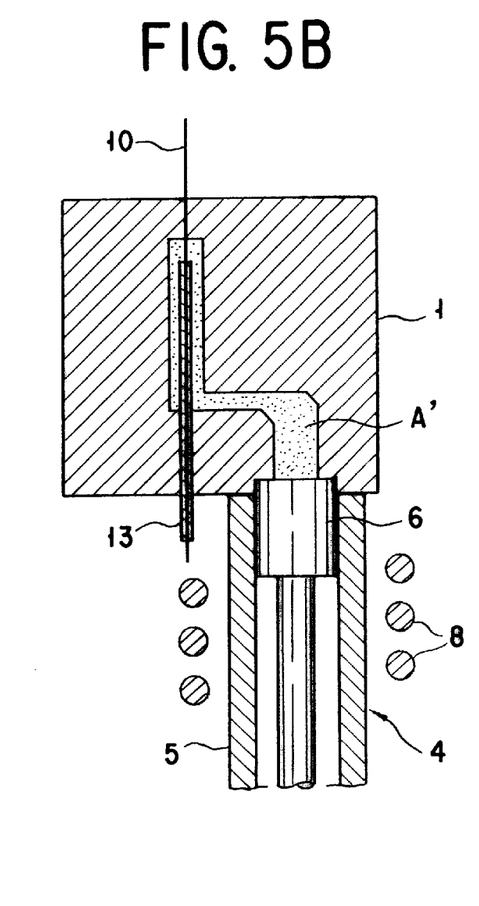
Figure 5C:
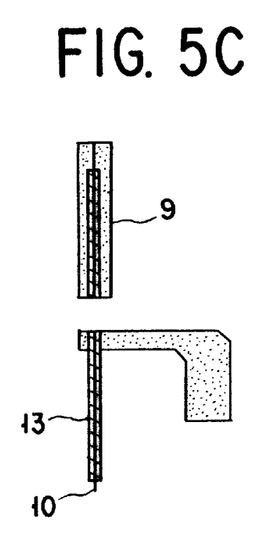

FIGS. 5A through 5C illustrate the schematic construction of another mode of embodying the apparatus and method for the production of the ferrule of the optical fiber built-in type according to the present invention. The structures of the metal mold 1 and the melting vessel 4 as well as the process are substantially identical with those illustrated in FIGS. 2A through 2C mentioned above except that in this embodiment a metal tube 13 made of, for example, stainless steel or Ni-based alloy is disposed in the cavity 2 of the mold 1 so as to extend therein leaving a prescribed gap between the top end of the metal tube 13 and the upper surface of the cavity 2 and the optical fiber 10 is inserted through this metal tube 13. By inserting the optical fiber 10 through the metal tube 13, the metal tube 13 protects the optical fiber 10 against the injection pressure during the casting and thus the breakage of the optical fiber 10 is effectively prevented.

The shapes of the cast products manufactured by the method described above are illustrated in FIG. 6 and FIG. 7.

Figure 6:
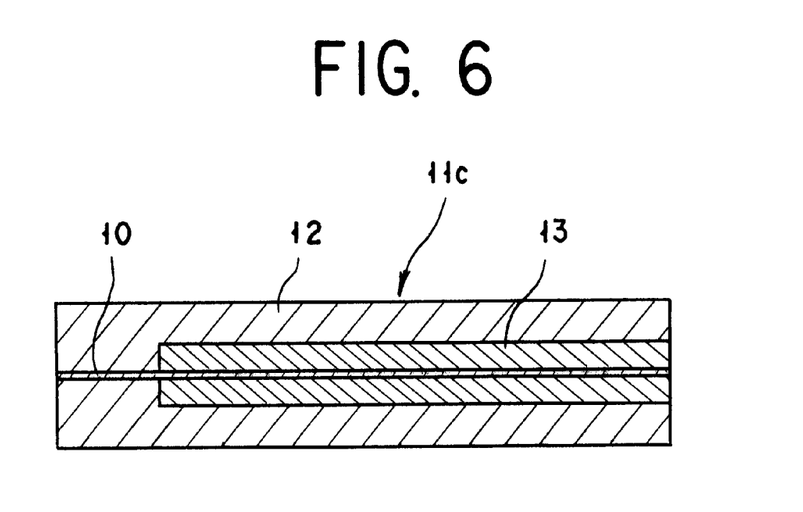
FIG. 6 is a cross-sectional view schematically illustrating still another embodiment of the ferrule of the optical fiber built-in type according to the present invention.
Figure 7:
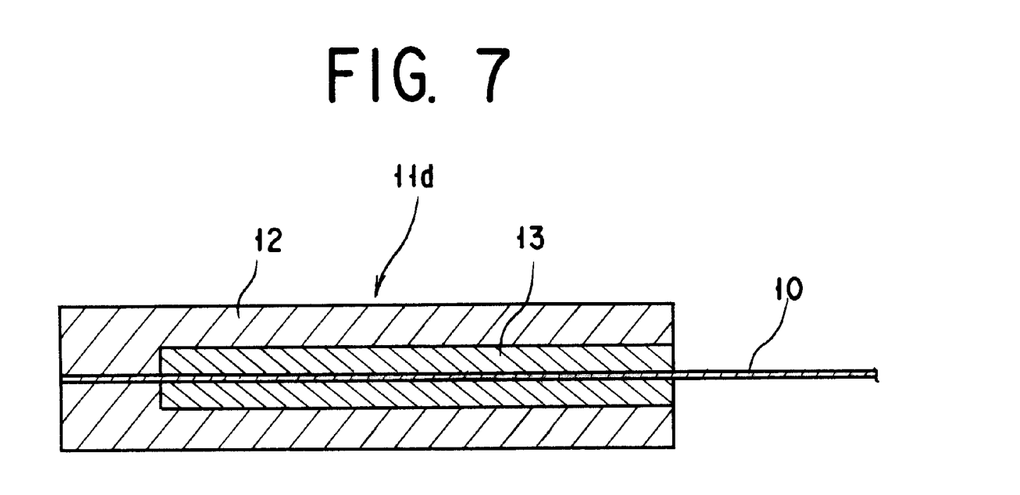
FIG. 7 is a fragmentary cross-sectional view schematically illustrating yet another embodiment of the ferrule of the optical fiber built-in type according to the present invention.

The ferrule (capillary) 11c of the optical fiber built-in type illustrated in FIG. 6 comprises a metallic ferrule (capillary) 12 and an optical fiber 10 integrally incorporated in the metallic ferrule 12 together with the metal tube 13 and having opposite ends cut in flush with the end faces of the metallic ferrule. On the other hand, in the ferrule 11d of the optical fiber built-in type illustrated in FIG. 7, one end of the optical fiber 10 integrally incorporated in the metallic ferrule 12 together with the metal tube 13 is cut in flush with the end face of the metallic ferrule 12, while the remaining portion thereof continuously extends from the other end of the metallic ferrule 12. In either product, since the cast product slightly shrinks in the radial direction due to the thermal shrinkage or coagulation shrinkage, the optical fiber 10 is strongly fixed in the metallic ferrule 12 through the medium of the metal tube 13 embedded therein integrally without causing any gap therebetween.

As a metallic material used for the production of the ferrule of the optical fiber built-in type according to the present invention, alloys for die casting such as Al-based alloys, Mg-based alloys, Zn-based alloys, Fe-based alloys, Cu-based alloys, titanium alloys and the like may be advantageously used besides amorphous alloys. Such alloys for die casting are used in the conventional casting process and inexpensive in comparison with ceramics and amorphous alloys commonly used for the production of the optical connector parts. By using such alloys for die casting, the optical connector parts may be easily produced by molding the alloy under pressure in a metal mold by means of a die casting machine.

As Al-based alloys, Al—Si, Al—Mg, Al—Si—Cu, or Al—Si—Mg aluminum alloys for die casting such as, for example, ADC1, ADC5, and ADC12 according to JIS (Japanese Industrial Standard) class symbol may be advantageously used. Among other alloys mentioned above, ADC12 proves to be particularly advantageous. Likewise, as Mg-based alloys, Mg—Al or Mg—Al—Zn magnesium alloys for die casting such as, for example, MDC1A, MDC2A, and MDC3A may be advantageously used. Among other alloys mentioned above, MDCCA proves to be particularly advantageous. As Zn-based alloys, Zn—Al, Zn—Al—Cu, Zn—Al—Cu—Mg, or Zn—Mn—Cu zinc alloys for die casting such as, for example, AG40A, AG41A, and high Mn alloys may be advantageously used. Among other alloys mentioned above, high Mn alloys prove to be particularly advantageous. As Fe-based alloys, gray cast iron, austenite cast iron, and stainless cast steel, for example, may be cited. Among other alloys mentioned above, stainless cast steel proves to be particularly advantageous. As Cu-based alloys, brass, bronze, and aluminum bronze, for example, may be cited. Among other alloys mentioned above, aluminum bronze proves to be particularly advantageous. Typical examples of titanium alloys include α type alloys, β type alloys, and α+β type alloys. Among other alloys mentioned above, α+β type alloys prove to be particularly advantageous.

Among other alloys enumerated above, Fe—M—X alloys represented by the following general formula prove to be particularly advantageous.

wherein M represents Ni and/or Co, X represents at least one element selected from the group consisting of Mn, Si, Ti, Al, and C, and x, y, and z stand for weight percentages in the ranges of $30 \leq x \leq 40$, $0 \leq y \leq 10$, z being the balance inclusive of unavoidable impurities. Since the Fe—M—X alloys represented by the above general formula permit easy machining with high dimensional accuracy and have a coefficient of linear thermal expansion approximating to that of an optical fiber, they are suitable as the material for ferrules into which the optical fiber is fixed.

On the other hand, an amorphous alloy possesses highly accurate castability and machinability and, therefore, allows manufacture of a product of smooth surface faithfully reproducing the contour of the cavity of the mold by the metal mold casting method or molding method. Accordingly, the ferrule of the optical fiber built-in type which satisfies dimensional prescription, dimensional accuracy, and surface quality can be manufactured by a single process with high mass productivity insofar as the metal mold to be used is suitably prepared.

Although the material for the ferrule of the present invention does not need to be limited to any particular substance but may be any of the materials which can be used in the method of the present invention, the amorphous alloy having a composition represented by either one of the following general formulas (1) to (6) may be advantageously used.

$$M^1_a M^2_b Ln_c M^3_d M^4_e M^5_f \tag{1}$$

wherein $M^1$ represents either or both of the two elements, Zr and Hf; $M^2$ represents at least one element selected from the group consisting of Ni, Cu, Fe, Co, Mn, Nb, Ti, V, Cr, Zn, Al, and Ga; Ln represents at least one element selected from the group consisting of Y, La, Ce, Nd, Sm, Gd, Tb, Dy, Ho, Yb, and Mm (mish metal: aggregate of rare earth elements); $M^3$ represents at least one element selected from the group consisting of Be, B, C, N, and O; $M^4$ represents at least one element selected from the group consisting of Ta, W, and Mo; $M^5$ represents at least one element selected from the group consisting of Au, Pt, Pd, and Ag; and a, b, c, d, e, and f represent such atomic percentages as respectively satisfy $25 \leq a \leq 85$, $15 \leq b \leq 75$, $0 \leq c \leq 30$, $0 \leq d \leq 30$, $0 \leq e \leq 15$, and $0 \leq f \leq 15$.

The above amorphous alloy includes those represented by the following general formulas (1-a) to (1-p).

$$M^1_a M^2_b \tag{1-a}$$

This amorphous alloy has large negative enthalpy of mixing and good producibility of the amorphous structure due to the coexistence of the $M^2$ element and Zr or Hf.

$$M^1_a M^2_b Ln_c \tag{1-b}$$

The addition of a rare earth element to the alloy represented by the above general formula (1-a), as in this amorphous alloy, enhances the thermal stability of the amorphous structure.

$$M^1_a M^2_b M^3_d \tag{1-c}$$

$$M^1_a M^2_b Ln_c M^3_d \tag{1-d}$$

The filling of gaps in the amorphous structure with the $M^3$ element having a small atomic radius (Be, B, C, N, or O), as in these amorphous alloys, makes the structure stable and enhances the producibility of the amorphous structure.

$$M^1_a M^2_b M^4_e \tag{1-e}$$

$$M^1_a M^2_b Ln_c M^4_e \tag{1-f}$$

$$M^1_a M^2_b M^3_d M^4_e \tag{1-g}$$

$$M^1_a M^2_b Ln_c M^3_d M^4_e \tag{1-h}$$

The addition of a high melting metal, $M^4$ (Ta, W, or Mo) to the above alloys, as in these amorphous alloys, enhances the heat resistance and corrosion resistance without affecting the producibility of the amorphous structure.

$$M^1_a M^2_b M^5_f \tag{1-i}$$

$$M^1_a M^2_b Ln_c M^5_f \tag{1-j}$$

$$M^1_a M^2_b M^3_d M^5_f \tag{1-k}$$

$$M^1_a M^2_b Ln_c M^3_d M^5_f \tag{1-l}$$

$$M^1_a M^2_b M^4_e M^5_f \tag{1-m}$$

$$M^1_a M^2_b Ln_c M^4_e M^5_f \tag{1-n}$$

$$M^1_a M^2_b M^3_d M^4_e M^5_f \tag{1-o}$$

$$M^1_a M^2_b Ln_c M^3_d M^4_e M^5_f \tag{1-p}$$

These amorphous alloys containing a noble metal, $M^5$ (Au, Pt, Pd, or Ag) will not be brittle even if the crystallization occurs.

$$Al_{100-g-h-i} Ln_g M^6_h M^3_i \tag{2}$$

wherein Ln represents at least one element selected from the group consisting of Y, La, Ce, Nd, Sm, Gd, Tb, Dy, Ho, Yb, and Mm; $M^6$ represents at least one element selected from the group consisting of Ti, V, Cr, Mn, Fe, Co, Ni, Cu, Zr, Nb, Mo, Hf, Ta, and W; $M^3$ represents at least one element selected from the group consisting of Be, B, C, N, and O; and g, h, and i represent such atomic percentages as respectively satisfy $30 \leq g \leq 90$, $0 \leq h \leq 55$, and $0 \leq i \leq 10$.

The above amorphous alloy includes those represented by the following general formulas (2-a) and (2-b).

$$Al_{100-g-h} Ln_g M^6_h \tag{2-a}$$

This amorphous alloy has large negative enthalpy of mixing and good producibility of the amorphous structure.

$$Al_{100g-h-i} Ln_g M^6_h M^3_i \tag{2-b}$$

This amorphous alloy has a stable structure and enhanced producibility of the amorphous structure due to the filling of gaps in the amorphous structure with the $M^3$ element having a small atomic radius (Be, B, C, N, or O).

$$Mg_{100-p} M^7_p \tag{3}$$

wherein $M^7$ represents at least one element selected from the group consisting of Cu, Ni, Sn, and Zn; and p represents an atomic percentage falling in the range of $5 \leq p \leq 60$.

This amorphous alloy has large negative enthalpy of mixing and good producibility of the amorphous structure.

$$Mg_{100-q-r} M^7_q M^8_r \tag{4}$$

wherein $M^7$ represents at least one element selected from the group consisting of Cu, Ni, Sn, and Zn; $M^8$ represents at least one element selected from the group consisting of Al, Si, and Ca; and q and r represent such atomic percentages as respectively satisfy $1 \leq q \leq 35$ and $1 \leq r \leq 25$.

The filling of gaps in the amorphous structure of the alloy of the above general formula (3) with the $M^8$ element having a small atomic radius (Al, Si, or Ca), as in this amorphous alloy, makes the structure stable and enhances the producibility of the amorphous structure.

$$Mg_{100-q-s} M^7_q M^9_s \tag{5}$$

$$Mg_{100-q-r-s} M^7_q M^8_r M^9_s \tag{6}$$

wherein $M^7$ represents at least one element selected from the group consisting of Cu, Ni, Sn, and Zn; $M^8$ represents at least one element selected from the group consisting of Al, Si, and Ca; $M^9$ represents at least one element selected from the group consisting of Y, La, Ce, Nd, Sm, and Mm; and q, r, and s represent such atomic percentages as respectively satisfy $1 \leq q \leq 35$, $1 \leq r \leq 25$, and $3 \leq s \leq 25$.

The addition of a rare earth element to the alloy of the general formula (3) or (4) mentioned above, as in these amorphous alloys, enhances the thermal stability of the amorphous structure.

Among other amorphous alloys mentioned above, the Zr—TM—Al and Hf—TM—Al (TM: transition metal) amorphous alloys having very wide differences between the glass transition temperature (Tg) and the crystallization temperature (Tx) exhibit high strength and high corrosion resistance, possess wide supercooled liquid ranges (glass transition ranges), $\Delta Tx=Tx-Tg$, of not less than 30 K, and extremely wide supercooled liquid ranges of not less than 60 K in the case of the Zr—TM—Al amorphous alloys. In the above temperature ranges, these amorphous alloys manifest very satisfactory workability owing to viscous flow even at such low stress not more than some tens MPa. They are characterized by being produced easily and very stably as evinced by the fact that they are enabled to furnish an amorphous bulk material even by a casting method using a cooling rate of the order of some tens K/s. After a further study in search of uses for these alloys, the inventor has ascertained that by the metal mold casting from a melt and by the molding process utilizing the viscous flow resorting to the glass transition range as well, these alloys produce amorphous materials and permit very faithful reproduction of the shape and size of a molding cavity of a metal mold and, with the physical properties of the alloys as a contributory factor, befit the ferrule of the optical fiber built-in type.

The Zr—TM—Al and Hf—TM—Al amorphous alloys to be used in the present invention possess very large range of $\Delta Tx$, though variable with the composition of alloy and the method of determination. The $Zr_{60}Al_{15}Co_{2.5}Ni_{7.5}Cu_{15}$ alloy (Tg: 652K, Tx: 768K), for example, has such an extremely wide $\Delta Tx$ as 116 K. It also offers very satisfactory resistance to oxidation such that it is hardly oxidized even when it is heated in the air up to the high temperature of Tg. The Vickers hardness (Hv) of this alloy at temperatures from room temperature through the neighborhood of Tg is up to 460 (DPN), the tensile strength thereof is up to 1,600 MPa, and the bending strength thereof is up to 3,000 MPa. The thermal expansion coefficient, $\alpha$ of this alloy from room temperature through the neighborhood of Tg is as small as $1 \times 10^{-5}$/K, the Young's modulus thereof is 91 GPa, and the elastic limit thereof in a compressed state exceeds 4–5%. Further, the toughness of the alloy is high such that the Charpy impact value falls in the range of 6–7 J/cm$^2$. This alloy, while exhibiting such properties of very high strength as mentioned above, has the flow stress thereof lowered to the neighborhood of 10 MPa when it is heated up to the glass transition range thereof. This alloy, therefore, is characterized by being worked very easily and being manufactured with low stress into minute parts and high-precision parts complicated in shape. Moreover, owing to the properties of the so-called glass (amorphous) substance, this alloy is characterized by allowing manufacture of formed (deformed) articles with surfaces of extremely high smoothness and having substantially no possibility of forming a step which would arise when a slip band appeared on the surface as during the deformation of a crystalline alloy.

Generally, an amorphous alloy begins to crystallize when it is heated to the glass transition range thereof and retained therein for a long time. In contrast, the aforementioned alloys which possess such a wide $\Delta Tx$ range as mentioned above enjoy a stable amorphous phase and, when kept at a temperature properly selected in the $\Delta Tx$ range, avoid producing any crystal for a duration up to about two hours. The user of these alloys, therefore, does not need to feel any anxiety about the occurrence of crystallization during the standard molding process.

The aforementioned alloys manifest these properties unreservedly during the course of transformation thereof from the molten state to the solid state. Generally, the manufacture of an amorphous alloy requires rapid cooling. In contrast, the aforementioned alloys allow easy production of a bulk material of a single amorphous phase from a melt by the cooling which is effected at a rate of about 10 K/s. The solid bulk material consequently formed also has a very smooth surface. The alloys have transferability such that even a scratch of the order of microns inflicted by the polishing work on the surface of a metal mold is faithfully reproduced.

When the aforementioned alloys are adopted as the alloying material for the ferrule of the optical fiber built-in type, therefore, the metal mold to be used for producing the formed article is only required to have the surface thereof adjusted to fulfill the surface quality expected of the optical connector ferrule because the molded product faithfully reproduces the surface quality of the metal mold. In the conventional metal mold casting method, therefore, these alloys allow the steps for adjusting the size and the surface roughness of the molded article to be omitted or diminished.

The characteristics of the aforementioned amorphous alloys including in combination relatively low hardness, high tensile strength, high bending strength, relatively low Young's modulus, high elastic limit, high impact resistance, high resistance to abrasion, smoothness of surface, and highly accurate castability or workability render these alloys appropriate for use as the material for the ferrule of the optical fiber built-in type. They even allow these alloys to be molded for mass production by the molding method of the present invention.

Then, some examples of the application of the ferrule of the optical fiber built-in type according to the present invention will be described below with reference to the drawings.

Figure 8:
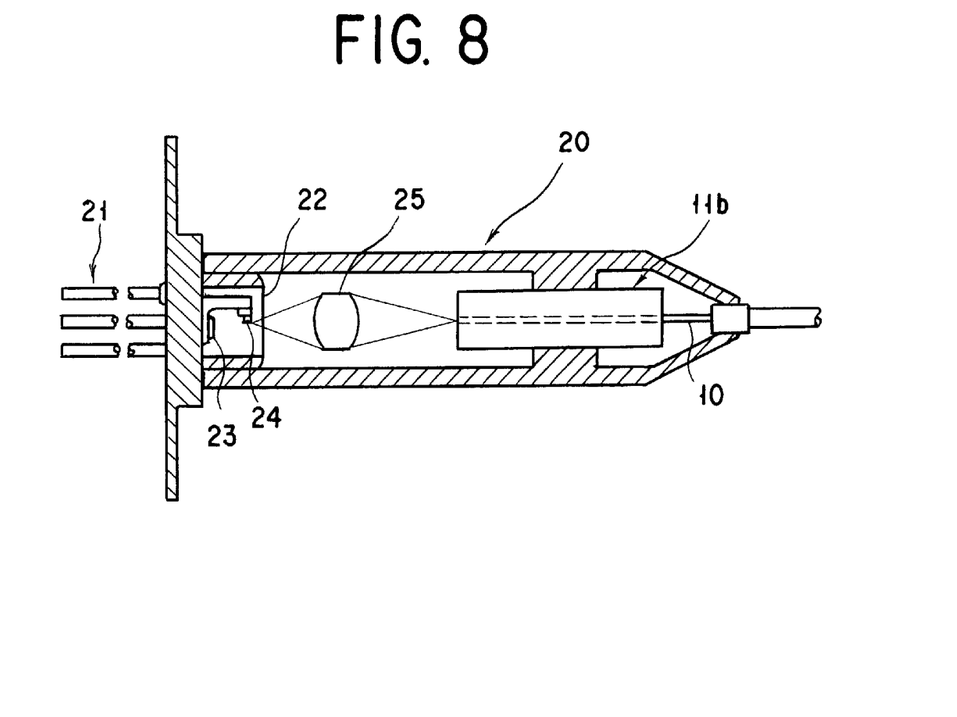
FIG. 8 is a fragmentary cross-sectional view schematically illustrating a construction of an LD module using the ferrule of the optical fiber built-in type according to the present invention.

FIG. 8 illustrates schematically the construction of a typical LD module 20 connected to a SM type optical fiber (single mode optical fiber). A monitor PD 23 and an LD (laser diode) chip 24 as a light emitting element are attached to a cap 22 having signal input terminals 21 connected thereto. Laser beams emitted from the LD chip 24 are introduced into the optical fiber 10 embedded in the ferrule 11b of the optical fiber built-in type through a lens 25. This ferrule 11b of the optical fiber built-in type is that manufactured by the method mentioned above according to the present invention.

Figure 9:
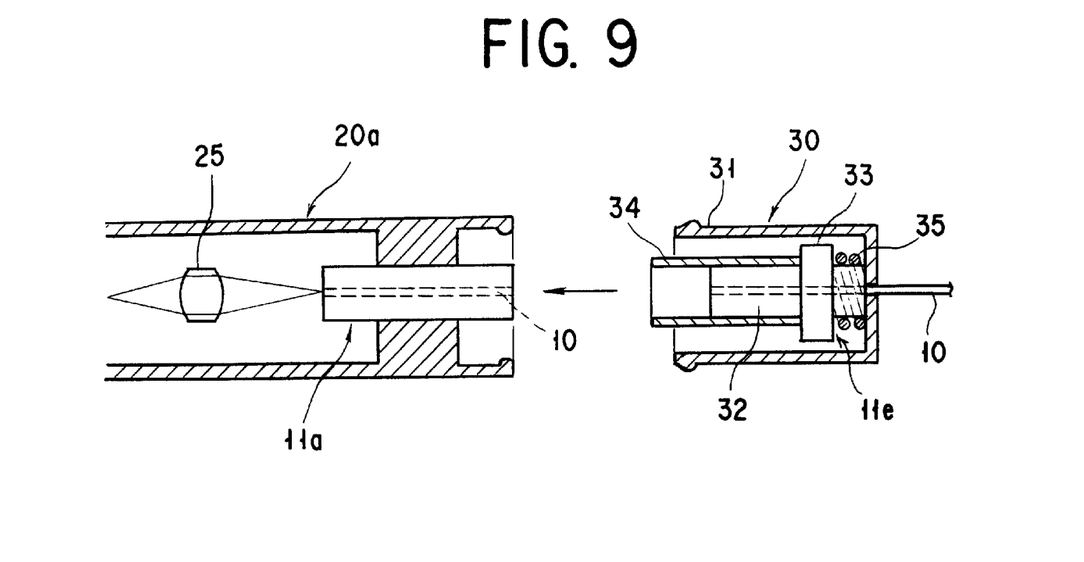
FIG. 9 is a fragmentary cross-sectional view schematically illustrating another construction of an LD module using the ferrules of the optical fiber built-in type according to the present invention.

FIG. 9 illustrates schematically the construction of another LD module. The capillary 11a of the optical fiber built-in type manufactured according to the present invention is attached to one end of the module 20a. The light emitted from the light emitting element (not shown) is introduced into the optical fiber 10 embedded in this capillary 11a.

Figure 10:
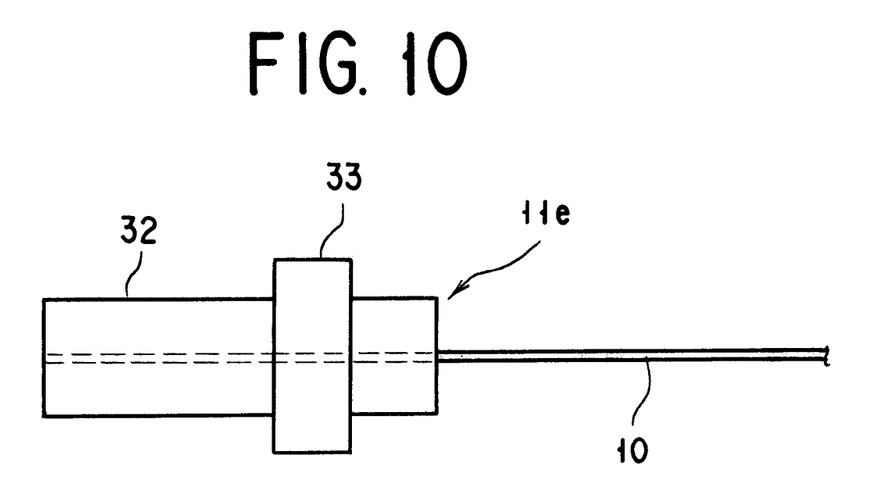
FIG. 10 is a side view of the ferrule of the optical fiber built-in type used in the LD module shown in FIG. 9.

In FIG. 9, reference numeral 30 denotes a connector be connected to the capillary 11a mentioned above by abutting to each other. Another ferrule 11e of the optical fiber built-in type as shown in FIG. 10 is disposed in a housing 31 of this connector. Although this ferrule 11e of the optical fiber built-in type is that obtained by the integral molding of a capillary portion 32 and a flange portion 33 with the optical fiber 10 according to the present invention, the capillary portion 32 and the flange portion 33 may be separate bodies. For instance, the ferrule of this type may be obtained by fixedly securing a flange part to the ferrule 11b of the optical fiber built-in type shown in FIG. 4 mentioned above. The capillary portion 32 of the above ferrule 11e of the optical fiber built-in type is fitted into a sleeve 34 and a spring member 35 is disposed between the flange portion 33 and the housing 31. Accordingly, by pressing the connector 30 against the module 20a so as to fit the exposed end of the ferrule 11a of the optical fiber built-in type into the sleeve 34, the connector 30 engages with the module 20a in the manner of snap-in fitting and the optical fibers 10, 10 respectively embedded in the capillary 11a of the optical fiber built-in type and the ferrule 11e of the optical fiber built-in type are aligned and connected to each other.

Now, the present invention will be described more concretely below with reference to working examples which have confirmed the effect of the present invention specifically.

EXAMPLE 1

An alloy having a composition of $Zr_{55}Al_{10}Ni_5Cu_{30}$ and previously manufactured by melting relevant component metals was melted thoroughly and injected into a metal mold provided with a cylindrical cavity, 2.5 mm in diameter and 16 mm in length, into which a quartz fiber was previously inserted along the axis thereof as shown in FIG. 2A. The metal mold and other parts were arranged in a vacuum of $1 \times 10^{-4}$ Torr. The casting was carried out by injecting the alloy melted by induction heating into the metal mold disposed above a piston under an injection pressure of 10 MPa by means of the piston, while applying a tension load of 20 MPa to the quartz fiber as shown in FIG. 2B. A product portion was severed from the resultant cast product, as shown in FIG. 2C, to obtain a capillary of the optical fiber built-in type as shown in FIG. 3.

The obtained capillary of the optical fiber built-in type measured 16 mm in length, 2.499 mm±0.2 μm in outside diameter, 0.4 μm in roundness, 0.4 μm in cylindricality, and 0.3 μm in surface roughness. The concentricity of the quartz fiber at the leading end of the cast product was 1.0 μm. The connector insertion loss and the return loss measured by using the capillary of the optical fiber built-in type obtained as described above were not more than 0.3 dB and not less than 40 dB, respectively, and thus satisfied the specified value for the optical connector. Further, there was not found any change in optical properties in the heat cycle test.

EXAMPLE 2

An alloy having a composition of $Zr_{55}Al_{10}Ni_5Cu_{30}$ and previously manufactured by melting relevant component metals was melted thoroughly and injected into a metal mold provided with a cylindrical cavity, 2.5 mm in diameter and 16 mm in length, into which a metal tube, 0.5 mm in outside diameter and 0.13 mm in inside diameter, having a quartz fiber inserted thereinto was previously inserted along the axis of the cavity as shown in FIG. 5A. The metal mold and other parts were arranged in a vacuum of $1 \times 10^{-4}$ Torr. The casting was carried out by injecting the alloy melted by induction heating into the metal mold disposed above a piston under an injection pressure of 10 MPa by means of the piston, while applying a tension load of 20 MPa to the quartz fiber as shown in FIG. 5B. A product portion was severed from the resultant cast product, as shown in FIG. 5C, to obtain a capillary of the optical fiber built-in type in which the metal tube having the optical fiber inserted thereinto was embedded, as shown in FIG. 6.

The obtained capillary of the optical fiber built-in type measured 16 mm in length, 2.499 mm±0.2 μm in outside diameter, 0.4 μm in roundness, 0.4 μm in cylindricality, and 0.3 μm in surface roughness. The concentricity of the quartz fiber at the leading end of the cast product was 1.0 μm. The connector insertion loss and the return loss measured by using the capillary of the optical fiber built-in type obtained as described above were not more than 0.3 dB and not less than 40 dB, respectively, and thus satisfied the specified value for the optical connector. Further, there was not found any change in optical properties in the heat cycle test.

While certain specific embodiments and working examples have been disclosed herein, the invention may be embodied in other specific forms without departing from the spirit or essential characteristics thereof. For instance, the method explained above manufactures one cast product by a single process using a metal mold provided with one molding cavity. Naturally, the present invention can manufacture two or more cast products by using a metal mold provided with two or more cavities therein. The present invention is not limited to the embodiments mentioned above with respect to the size, shape, and number of the ferrules of the optical fiber built-in type. Furthermore, the present invention is not limited to the examples of application mentioned above. The present invention may be applicable to the optical connector parts such as, for example, ferrules for use in the single mode optical connectors for aligning and connecting optical fibers by abutting opposed end faces of the optical fibers against each other and the optical parts for use in the multifiber optical connectors and for aligning the multiple optical fibers.

The described embodiments and examples are therefore to be considered in all respects as illustrative and not restrictive, the scope of the invention being indicated by the appended claims rather than by the foregoing description and all changes which come within the meaning and the range of equivalency of the claims are, therefore, intended to be embraced therein.

The disclosure in Japanese Patent Application No. 11-280974 of Oct. 1, 1999 is incorporated here by reference. This Japanese Patent Application describes the invention described hereinabove and claimed in the claims appended hereinbelow and provides the basis for a claim of priority for the instant invention under 35 U.S.C. 119.

What is claimed is:

1. An optical connector ferrule having an optical fiber incorporated therein as an integral part thereof, wherein said optical fiber is integrally fixed in said ferrule during the production of said ferrule and said ferrule is made of a substantially amorphous alloy having a composition represented by either one of the following general formulas (1) to (6) and containing an amorphous phase in a volumetric ratio of at least 50%:

$$M^1_a M^2_b Ln_c M^3_d M^4_e M^5_f \tag{1}$$

wherein $M^1$ represents either or both of the two elements, Zr and Hf; $M^2$ represents at least one element selected from the group consisting of Ni, Cu, Fe, Co, Mn, Nb, Ti, V, Cr, Zn, Al, and Ga; Ln represents at least one element selected from the group consisting of Y, La, Ce, Nd, Sm, Gd, Tb, Dy, Ho, Yb, and Mm (mish metal: aggregate of rare earth elements); $M^3$ represents at least one element selected from the group consisting of Be, B, C, N, and O; $M^4$ represents at least one element selected from the group consisting of Ta, W, and Mo; $M^5$ represents at least one element selected from the group consisting of Au, Pt, Pd, and Ag; and a, b, c, d, e, and f represent such atomic percentages as respectively satisfy $25 \leq a \leq 85$, $15 \leq b \leq 75$, $0 \leq c \leq 30$, $0 \leq d \leq 30$, $0 \leq e \leq 15$, and $0 \leq f \leq 15$, $$Al_{100-g-h-i}Ln_g M^6_h M^3_i \quad (2)$$

wherein Ln represents at least one element selected from the group consisting of Y, La, Ce, Nd, Sm, Gd, Tb, Dy, Ho, Yb, and Mm; $M^6$ represents at least one element selected from the group consisting of Ti, V, Cr, Mn, Fe, Co, Ni, Cu, Zr, Nb, Mo, Hf, Ta, and W; $M^3$ represents at least one element selected from the group consisting of Be, B, C, N, and O; and g, h, and i represent such atomic percentages as respectively satisfy $30 \leq g \leq 90$, $0 \leq h \leq 55$, $0 \leq i \leq 10$, $$Mg_{100-p}M^7_p \quad (3)$$

wherein $M^7$ represents at least one element selected from the group consisting of Cu, Ni, Sn, and Zn; and p represents an atomic percentage falling in the range of $5 \leq p \leq 60$, $$Mg_{100-q-r}M^7_q M^8_r \quad (4)$$

wherein $M^7$ represents at least one element selected from the group consisting of Cu, Ni, Sn, and Zn; $M^8$ represents at least one element selected from the group consisting of Al, Si, and Ca; and q and r represent such atomic percentages as respectively satisfy $1 \leq q \leq 35$ and $1 \leq r \leq 25$, $$Mg_{100-q-s}M^7_q M^9_s \quad (5)$$

wherein $M^7$ represents at least one element selected from the group consisting of Cu Ni, Sn, and Zn; $M^9$ represents at least one element selected from the group consisting of Y, La, Ce, Nd, Sm, and Mm; and q and s represent such atomic percentages as respectively satisfy $1 \leq q \leq 35$ and $3 \leq s \leq 25$, and $$Mg_{100-q-r-s}M^7_q M^8_r M^9_s \quad (6)$$

wherein $M_7$ represents at least one element selected from the group consisting of Cu, Ni, Sn, and Zn; $M^8$ represents at least one element selected from the group consisting of Al, Si, and Ca; $M^9$ represents at least one element selected from the group consisting of Y, La, Ce, Nd, Sm, and Mm; and q, r, and s represent such atomic percentages as respectively satisfy $1 \leq q \leq 35$, $1 \leq r \leq 25$, and $3 \leq s \leq 25$.

2. The ferrule according to claim 1, wherein said optical fiber is fixed in said ferrule by the thermal shrinkage or coagulation shrinkage of the optical connector ferrule during the production of said ferrule.

3. The ferrule according to claim 1, wherein said optical fiber extends in the interior of said optical connector ferrule from one end to the other end of said ferrule.

4. The ferrule according to claim 1, wherein said optical fiber extends in the interior of said optical connector ferrule from one end to the other end of said ferrule and further continuously extends outward from one end of said optical connector ferrule.

5. The ferrule according to claim 1, wherein said ferrule has an outside diameter ranging from 0.2 mm to 2.5 mm.

6. An optical connector ferrule having an optical fiber incorporated therein as an integral part thereof, comprising an optical connector ferrule, a metal tube embedded in said ferrule in the longitudinal direction thereof, and an optical fiber fitted into said metal tube, wherein said optical fiber is integrally fixed in said ferrule through the medium of said metal tube during the production of said ferrule and said ferrule is made of a substantially amorphous alloy having a composition represented by either one of the following general formulas (1) to (6) and containing an amorphous phase in a volumetric ratio of at least 50%:

$$M^1_a M^2_b Ln_c M^3_d M^4_e M^5_f \quad (1)$$

wherein $M^1$ represents either or both of the two elements, Zr and HF; $M^2$ represents at least one element selected from the group consisting of Ni, Cu, Fe, Co, Mn, Nb, Ti, V, Cr, Zn, Al, and Ga; Ln represents at least one element selected from the group consisting of Y, La, Ce, Nd, Sm, Gd, Tb, Dy, Ho, Yb, and Mm (mish metal: aggregate of rare earth elements); $M^3$ represents at least one element selected from the group consisting of Be, B, C, N, and O; $M^4$ represents at least one element selected from the group consisting of Ta, W, and Mo; $M^5$ represents at least one element selected from the group consisting of Au, Pt, Pd, and Ag; and a, b, c, d, e, and f represent such atomic percentages as respectively satisfy $25 \leq a \leq 85$, $15 \leq b \leq 75$, $0 \leq c \leq 30$, $0 \leq d \leq 30$, $0 \leq e \leq 15$, and $0 \leq f \leq 15$, $$Al_{100-g-h-i}Ln_g M^6_h M^3_i \quad (2)$$

wherein Ln represents at least one element selected from the group consisting of Y, La, Ce, Nd, Sm, Gd, Tb, Dy, Ho, Yb, and Mm; $M^6$ represents at least one element selected from the group consisting of Ti, V, Cr, Mn, Fe, Co, Ni, Cu, Zr, Nb, Mo, Hf, Ta, and W; $M^3$ represents at least one element selected from the group consisting of Be, B, C, N, and O; and g, h, and i represent such atomic percentages as respectively satisfy $30 \leq g \leq 90$, $0 \leq h \leq 55$, $0 \leq i \leq 10$, $$Mg_{100-p}M^7_p \quad (3)$$

wherein $M^7$ represents at least one element selected from the group consisting of Cu, Ni, Sn, and Zn; and p represents an atomic percentage falling in the range of $5 \leq p \leq 60$, $$Mg_{100-q-r}M^7_q M^8_r \quad (4)$$

wherein $M^7$ represents at least one element selected from the group consisting of Cu, Ni, Sn, and Zn; $M^8$ represents at least one element selected from the group consisting of Al, Si, and Ca; and q and r represent such atomic percentages as respectively satisfy $1 \leq q \leq 35$ and $1 \leq r \leq 25$, $$Mg_{100-q-s}M^7_q M^9_s \quad (5)$$

wherein $M^7$ represents at least one element selected from the group consisting of Cu, Ni, Sn, and Zn; $M^9$ represents at least one element selected from the group consisting of Y, La, Ce, Nd, Sm, and Mm; and q and s represent such atomic percentages as respectively satisfy $1 \leq q \leq 35$ and $3 \leq s \leq 25$, and $$Mg_{100-q-r-s}M^7_q M^8_r M^9_s \quad (6)$$

wherein $M^7$ represents at least one element selected from the group consisting of Cu, Ni, Sn, and Zn; $M^8$ represents at least one element selected from the group consisting of Al, Si, and Ca; $M^9$ represents at least one element selected from the group consisting of Y, La, Ce, Nd, Sm, and Mm; and q, r, and s represent such atomic percentages as respectively satisfy $1 \leq q \leq 35$, $1 \leq r \leq 25$, and $3 \leq s \leq 25$.

7. The ferrule according to claim 6, wherein said optical fiber and said metal tube are fixed in the ferrule by the thermal shrinkage or coagulation shrinkage of the optical connector ferrule during the production of said ferrule.

8. The ferrule according to claim 6, wherein said optical fiber extends in the interior of said optical connector ferrule from one end to the other end of said ferrule.

9. The ferrule according to claim 6, wherein said optical fiber extends in the interior of said optical connector ferrule from one end to the other end of said ferrule and further continuously extends outward from one end of said optical connector ferrule.

10. The ferrule according to claim 6, wherein said metal tube has an inside diameter ranging from 0.1 mm to 1.0 mm and an outside diameter ranging from 0.14 mm to 2.3 mm.

11. The ferrule according to claim 6, wherein said ferrule has an outside diameter ranging from 0.2 mm to 2.5 mm.

12. A method for the production of an optical connector ferrule having an optical fiber incorporated therein as an integral part thereof, comprising the steps of:
inserting an optical fiber into a mold provided with a molding cavity which defines the outer shape of an optical connector ferrule so,as to be disposed in said cavity,
applying a tension load to said optical fiber,
injecting a fluid material kept at an elevated temperature into the cavity of said mold, and
solidifying the cast material by cooling, thereby fixing said optical fiber in the ferrule produced.

13. The method according to claim 12, wherein said optical fiber is set in said mold so as to have one end thereof continuously extended outward from the mold.

14. The method according to claim 12, wherein said fluid material is a metal.

15. The method according to claim 12, wherein said fluid material is an amorphous alloy containing an amorphous phase in a volumetric ratio of at least 50%.

16. The method according to claim 12, wherein said fluid material is a ceramic paste.

17. The method according to claim 12, wherein said fluid material is a synthetic resin.

18. A method for the production of an optical connector ferrule having an optical fiber incorporated therein as an integral part thereof, comprising the steps of:
inserting an optical fiber into a mold provided with a molding cavity which defines the outer shape of an optical connector ferrule so as to be disposed in said cavity;
applying a tension load to said optical fiber,
injecting a fluid material kept at an elevated temperature into the cavity of said mold, and
solidifying the cast material by cooling, thereby fixing said optical fiber in the ferrule produced,
wherein said fluid material is a melt of an alloying material capable of producing a substantially amorphous alloy having a composition represented by either one of the following general formulas (1) to (6) and containing an amorphous phase in a volumetric ratio of at least 50%, and this molten alloy is forcibly transferred into the cavity of said mold and rapidly solidified in the mold to confer amorphousness on the alloy;

$$M^1_a M^2_b Ln_c M^3_d M^4_e M^5_f \qquad (1)$$

wherein $M^1$ represents either or both of the two elements, Zr and Hf; $M^2$ represents at least one element selected from the group consisting of Ni, Cu, Fe, Co, Mn, Nb, Ti, V, Cr, Zn, Al, and Ga; Ln represents at least one element selected from the group consisting of Y, La, Ce, Nd, Sm, Gd, Tb, Dy, Ho, Yb, and Mm (mish metal: aggregate of rare earth elements); $M^3$ represents at least one element selected from the group consisting of Be, B, C, N, and O; $M^4$ represents at least one element selected from the group consisting of Ta, W, and Mo; $M^5$ represents at least one element selected from the group consisting of Au, Pt, Pd, and Ag; and a, b, c, d, e, and f represent such atomic percentages as respectively satisfy $25 \leq a \leq 85$, $15 \leq b \leq 75$, $0 \leq c \leq 30$, $0 \leq d \leq 30$, $0 \leq e \leq 15$, and $0 \leq f \leq 15$, $$Al_{100-g-h-i} Ln_g M^6_h M^3_i \qquad (2)$$

wherein Ln represents at least one element selected from the group consisting of Y, La, Ce, Nd, Sm, Gd, Tb, Dy, Ho, Yb, and Mm; $M^6$ represents at least one element selected from the group consisting of Ti, V, Cr, Mn, Fe, Co, Ni, Cu, Zr, Nb, Mo, Hf, Ta, and W; $M^3$ represents at least one element selected from the group consisting of Be, B, C, N, and O; and g, h, and i represent such atomic percentages as respectively satisfy $30 \leq g \leq 90$, $0 \leq h \leq 55$, $0 \leq i \leq 10$, $$Mg_{100-p} M^7_p \qquad (3)$$

wherein $M^7$ represents at least one element selected from the group consisting of Cu, Ni, Sn, and Zn; and p represents an atomic percentage falling in the range of $5 \leq p \leq 60$, $$Mg_{100-q-r} M^7_q M^8_r \qquad (4)$$

wherein $M^7$ represents at least one element selected from the group consisting of Cu, Ni, Sn, and Zn; $M^8$ represents at least one element selected from the group consisting of Al, Si, and Ca; and q and r represent such atomic percentages as respectively satisfy $1 \leq q \leq 35$ and $1 \leq r \leq 25$, $$Mg_{100-q-s} M^7_q M^9_s \qquad (5)$$

wherein $M^7$ represents at least one element selected from the group consisting of Cu, Ni, Sn, and Zn; $M^9$ represents at least one element selected from the group consisting of Y, La, Ce, Nd, Sm, and Mm; and q and s represent such atomic percentages as respectively satisfy $1 \leq q \leq 35$ and $3 \leq s \leq 25$, and $$Mg_{100-q-r-s} M^7_q M^8_r M^9_s \qquad (6)$$

wherein $M^7$ represents at least one element selected from the group consisting of Cu, Ni, Sn, and Zn; MA represents at least one element selected from the group consisting of Al, Si, and Ca; $M^9$ represents at least one element selected from the group consisting of Y, La, Ce, Nd, Sm, and Mm; and q, r, and s represent such atomic percentages as respectively satisfy $1 \leq q \leq 35$, $1 \leq r \leq 25$, and $3 \leq s \leq 25$.

19. A method for the production of an optical connector ferrule having an optical fiber incorporated therein as an integral part thereof, comprising the steps of:
inserting a metal tube having an optical fiber fitted therein into a mold provided with a molding cavity which defines the outer shape of an optical connector ferrule so as to be disposed in said cavity,
said ferrule is produced while applying a tension load to said optical fiber,
injecting a fluid material kept at an elevated temperature into the cavity of said mold, and
solidifying the cast material by cooling, thereby fixing said optical fiber in the produce ferrule through the medium of said metal tube embedded in said ferrule.

20. The method according to claim 19, wherein said optical fiber is set in said mold so as to have one end thereof continuously extended outward from the mold.

21. The method according to claim 19, wherein said fluid material is a metal.

22. The method according to claim 19, wherein said fluid material is an amorphous alloy containing an amorphous phase in a volumetric ratio of at least 50%.

23. The method according to claim 19, wherein said fluid material is a ceramic paste.

24. The method according to claim 19, wherein said fluid material is a synthetic resin.

25. A method for the production of an optical connector ferrule having an optical fiber incorporated therein as an integral part thereof, comprising the steps of:

inserting a metal tube having an optical fiber fitted therein into a mold provided with a molding cavity which defines the outer shape of an optical connector ferrule so as to be disposed in said cavity, said ferrule is produced while applying a tension load to said optical fiber, injection a fluid material kept at an elevated temperature into the cavity of said mold, and solidifying the cast material by cooling, thereby fixing said optical fiber in the produce ferrule through the medium of said metal tube embedded in said ferrule, wherein said fluid material is a melt of an alloying material capable of producing a substantially amorphous alloy having a composition represented by either one of the following general formulas (1) to (6) and containing an amorphous phase in a volumetric ratio of at least 50%, and this molten alloy is forcibly transferred into the cavity of said mold and rapidly solidified in the mold to confer amorphousness on the allow;

$$M^1_a M^2_b Ln_c M^3_d M^4_e M^5_f \qquad (1)$$

wherein $M^1$ represents either or both of the two elements, Zr and HF; $M^2$ represents at least one element selected from the group consisting of Ni, Cu, Fe, Co, Mn, Nb, Ti, V, Cr, Zn, Al, and Ga; Ln represents at least one element selected from the group consisting of Y, La, Ce, Nd, Sm, Gd, Tb, Dy, Ho, Yb, and Mm (mish metal: aggregate of rare earth elements); $M^3$ represents at least one element selected from the group consisting of Be, B, C, N, and O; $M^4$ represents at least one element selected from the group consisting of Ta, W, and Mo; $M^5$ represents at least one element selected from the group consisting of Au, Pt, Pd, and Ag; and a, b, c, d, e, and f represent such atomic percentages as respectively satisfy $25 \leq a \leq 85$, $15 \leq b \leq 75$, $0 \leq c \leq 30$, $0 \leq d \leq 30$, $0 \leq e \leq 15$, and $0 \leq f \leq 15$, $$Al_{100-g-h-i} Ln_g M^6_h M^3_i \qquad (2)$$

wherein Ln represents at least one element selected from the group consisting of Y, La, Ce, Nd, Sm, Gd, Tb, Dy, Ho, Yb, and Mm; $M^6$ represents at least one element selected from the group consisting of Ti, V, Cr, Mn, Fe, Co, Ni, Cu, Zr, Nb, Mo, Hf, Ta, and W; $M^3$ represents at least one element selected from the group consisting of Be, B, C, N, and O; and g, h, and i represent such atomic percentages as respectively satisfy $30 \leq g \leq 90$, $0 \leq h \leq 55$, $0 \leq i \leq 10$, $$Mg_{100-p} M^7_p \qquad (3)$$

wherein $M^7$ represents at least one element selected from the group consisting of Cu, Ni, Sn, and Zn; and p represents an atomic percentage falling in the range of $5 \leq p \leq 60$, $$Mg_{100-q-r} M^7_q M^8_r \qquad (4)$$

wherein $M^7$ represents at least one element selected from the group consisting of Cu, Ni, Sn, and Zn; $M^8$ represents at least one element selected from the group consisting of Al, Si, and Ca; and q and r represent such atomic percentages as respectively satisfy $1 \leq q \leq 35$ and $1 \leq r \leq 25$, $$Mg_{100-q-s} M^7_q M^9_s \qquad (5)$$

wherein $M^7$ represents at least one element selected from the group consisting of Cu, Ni, Sn, and Zn; $M_9$ represents at least one element selected from the group consisting of Y, La, Ce, Nd, Sm, and Mm; and q and s represent such atomic percentages as respectively satisfy $1 \leq q \leq 35$ and $3 \leq s \leq 25$, and $$Mg_{100-q-r-s} M^7_q M^8_r M^9_s \qquad (6)$$

wherein $M^7$ represents at least one element selected from the group consisting of Cu, Ni, Sn, and Zn; $M^8$ represents at least one element selected from the group consisting of Al, Si, and Ca; $M^9$ represents at least one element selected from the group consisting of Y, La, Ce, Nd, Sm, and Mm; and q, r, and s represent such atomic percentages as respectively satisfy $1 \leq q \leq 35$, $1 \leq r \leq 25$, and $3 \leq s \leq 25$.

* * * * *

UNITED STATES PATENT AND TRADEMARK OFFICE
CERTIFICATE OF CORRECTION

PATENT NO.    : 6,435,731 B1
DATED         : August 20, 2002
INVENTOR(S)   : Tadashi Yamaguchi et al.

It is certified that error appears in the above-identified patent and that said Letters Patent is hereby corrected as shown below:

Column 15,
Line 34, "Cu Ni," should read -- Cu, Ni, --.
Line 42, "$M_7$" should read -- $M^7$ --.

Column 17,
Line 19, "so,as" should read -- so as --.

Column 18,
Line 44, "MA" should read -- $M^8$ --.
Line 63, "produce" should read -- produced --.
Column 19,
Line 20, "injection" should read -- injecting --.
Line 24, "produce" should read -- produced --.
Line 33, "allow" should read -- alloy --.

Column 20,
Line 31, "$M_9$" should read -- $M^9$ --.

Signed and Sealed this

Twenty-ninth Day of July, 2003

JAMES E. ROGAN
*Director of the United States Patent and Trademark Office*